(12) United States Patent
Han et al.

(10) Patent No.: US 10,831,325 B2
(45) Date of Patent: Nov. 10, 2020

(54) SENSOR PATTERNING WITH REDUCED TRACE VISIBILITY FOR CAPACITANCE SENSING

(71) Applicant: Synaptics Incorporated, San Jose, CA (US)

(72) Inventors: Sang Chul Han, Taipei (TW); Chin Siang Lim, Taipei (TW)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/188,725

(22) Filed: Nov. 13, 2018

(65) Prior Publication Data

US 2020/0150792 A1    May 14, 2020

(51) Int. Cl.
    *G06F 3/044*     (2006.01)

(52) U.S. Cl.
    CPC .... *G06F 3/044* (2013.01); *G06F 2203/04101* (2013.01)

(58) Field of Classification Search
    CPC .................. G06F 3/044; G06F 2203/04101
    See application file for complete search history.

(56) References Cited

U.S. PATENT DOCUMENTS

| | | | |
|---|---|---|---|
| 9,182,861 B2 | 11/2015 | Bulea et al. | |
| 2011/0109579 A1* | 5/2011 | Wang | G06F 3/0412 345/173 |
| 2018/0210577 A1* | 7/2018 | Chan | G06F 3/044 |
| 2019/0220114 A1* | 7/2019 | Shu | G06F 3/0446 |

* cited by examiner

*Primary Examiner* — Stephen G Sherman
(74) *Attorney, Agent, or Firm* — Ferguson Braswell Fraser Kubasta PC (57) ABSTRACT

An input device includes a first electrode layer including electrodes, a second electrode layer including electrodes, an insulating layer disposed between the first and the second electrode layers, and capacitive sensing elements organized in rows and columns. Each of the capacitive sensing elements is formed by one of the electrodes in the first electrode layer and one of the electrodes in the second electrode layer. A set of the capacitive sensing elements organized in adjacent rows shares a common first electrode in the first electrode layer. Each of the capacitive sensing elements in the set of capacitive sensing elements is associated with a distinct electrode of the electrodes in the second electrode layer.

20 Claims, 6 Drawing Sheets

SENSOR PATTERNING WITH REDUCED TRACE VISIBILITY FOR CAPACITANCE SENSING

TECHNICAL FIELD

The described embodiments relate generally to electronic devices, and more specifically, to proximity sensor devices and sensor patterning s that enable proximity sensing.

BACKGROUND

Input devices including proximity sensor devices such as touchpads or touch sensor devices, are widely used in a variety of electronic systems. A proximity sensor device typically includes a sensing region, often demarked by a surface, in which the proximity sensor device determines the presence, location and/or motion of one or more input objects. The presence, location and/or motion of the one or more input objects are detected using electrodes. In particular, electrodes connected to a processing system via traces are affected by the presence of an input object in the sensing region. The layout of the electrodes and the traces may have a impact on the detectability of input objects, and the display.

SUMMARY

In general, one or more embodiments relate to an input device. The input device comprises: a first electrode layer comprising a plurality of electrodes; a second electrode layer comprising a plurality of electrodes; an insulating layer disposed between the first and the second electrode layers; and a plurality of capacitive sensing elements organized in rows and columns, wherein each of the capacitive sensing elements is formed by one of the plurality of electrodes in the first electrode layer and one of the plurality of electrodes in the second electrode layer, wherein a first plurality of capacitive sensing elements organized in adjacent rows share a common first electrode in the first electrode layer, and wherein each of the first plurality of capacitive sensing elements is associated with a distinct electrode of the plurality of electrodes in the second electrode layer.

In general, one or more embodiments relate to an electronic device. The electronic device comprises: a display configured to provide visual output; an input surface configured to receive an input by an input object; and an input device disposed between the display and the input surface and configured to process the received input by the input object, the input device comprising: a first electrode layer comprising a plurality of electrodes; a second electrode layer comprising a plurality of electrodes; an insulating layer disposed between the first and the second electrode layers; and a plurality of capacitive sensing elements organized in rows and columns, wherein each of the capacitive sensing elements is formed by one of the plurality of electrodes in the first electrode layer and one of the plurality of electrodes in the second electrode layer, wherein a first plurality of capacitive sensing elements organized in adjacent rows share a common first electrode in the first electrode layer, and wherein each of the first plurality of capacitive sensing elements is associated with a distinct electrode of the plurality of electrodes in the second electrode layer.

Other aspects of the embodiments will be apparent from the following description and the appended claims.

BRIEF DESCRIPTION OF DRAWINGS

The present embodiments are illustrated by way of example and are not intended to be limited by the figures of the accompanying drawings.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that may facilitate improved usability along with various other benefits.

Figure 1:
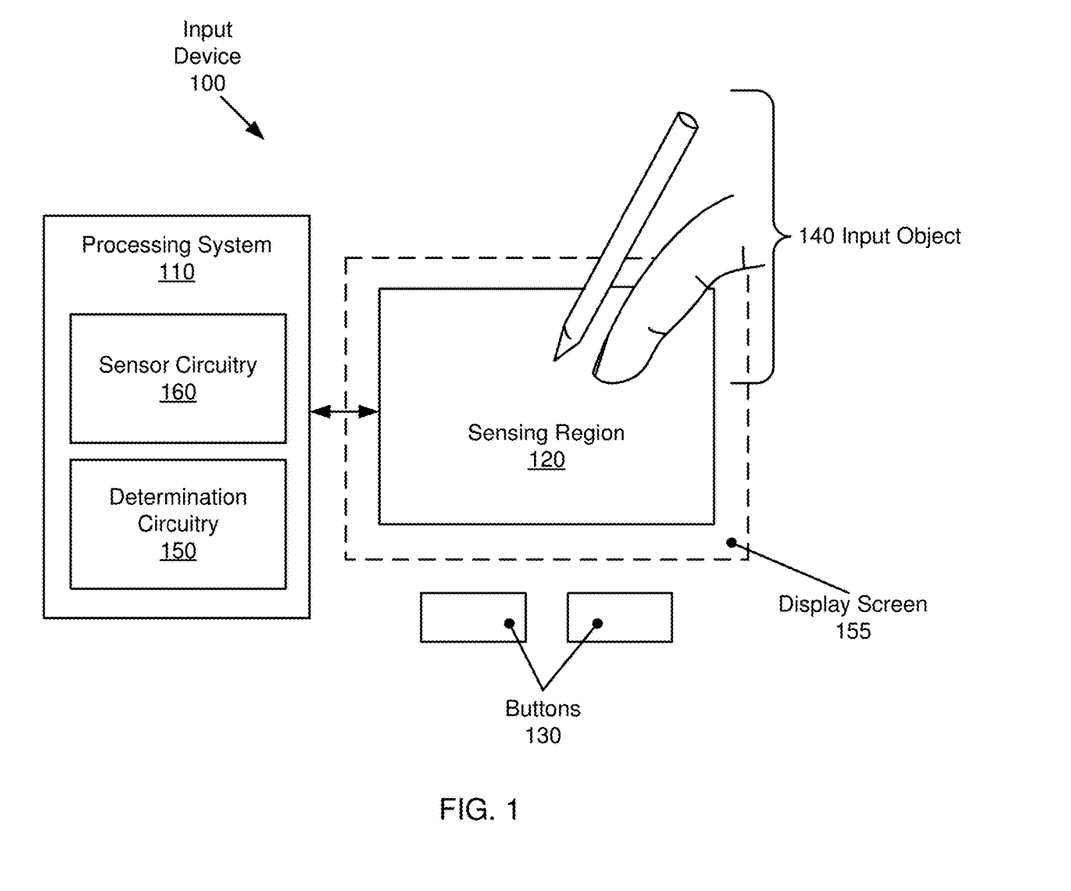
FIG. 1 shows a block diagram of an input device in accordance with one or more embodiments.

Turning now to the figures, FIG. 1 is a block diagram of an exemplary input device (100) within which the present embodiments may be implemented. The input device (100) includes a processing system (110) and a sensing region (120). The input device (100) may be configured to provide input to an electronic system (not shown for simplicity). Examples of electronic systems (or electronic devices) may include personal computers (e.g., desktop computers, laptop computers, tablet computers, netbook computers, tablets, web browsers, e-book readers, and personal digital assistants (PDAs)), composite input devices (e.g., physical keyboards, joysticks, or key switches), data input devices (e.g., remote controls and mice), data output devices (e.g., display screens and printers), remote terminals, kiosks, and video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). The electronic system can be a host or a slave to the input device.

The input device (100) may be implemented as a physical part of the corresponding electronic system, or may be physically separate from the electronic system. Further, portions of the input device (100) may be part of the electronic system. For example, all or part of the determination circuitry (150) may be implemented in the device driver of the electronic system. The input device (100) may be coupled to and communicate with components of the electronic system using various wired or wireless technologies, such as buses and networks. Example technologies may include Inter-Integrated Circuit (I²C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (e.g., a "touchpad" or a "touch sensor device") configured to sense input provided by one or more input objects (140) in a sensing region (120). Example input objects include styli, active pen, fingers, fingertips, and the like. The sensing region (120) may encompass any space above, around, in, and/or proximate to the input device (100) in which the input device (100) is able to detect user input (e.g., provided by one or more input objects 140)). The size, shape, and location of particular sensing region (120) (e.g., relative to the electronic system) may vary depending on actual implementations.

In some embodiments, the sensing region (120) extends from a surface of the input device (100) in one or more directions in space, for example, until a signal-to-noise ratio (SNR) of the sensors falls below a threshold suitable for object detection. For example, the distance to which this sensing region (120) extends in a particular direction may be on the order of less than a millimeter, millimeters, centimeters, or more, and may vary with the type of sensing technology used and/or the accuracy desired. In some embodiments, the sensing region (120) may detect inputs involving no physical contact with any surfaces of the input device (100), contact with an input surface (e.g. a touch surface) of the input device (100), contact with an input surface (e.g., a touch surface and/or screen) of the input device (100), contact with an input surface of the input device (100) coupled with some amount of applied force or pressure, and/or a combination thereof.

The input device (100) may utilize various combination of sensor components and sensing technologies to detect user input in the sensing region (120). In one or more embodiments, the input device (100) uses one or more capacitive sensing technologies. The input device (100) may include one or more sensing elements configured to implement the various sensing technologies.

In some capacitive implementations of the input device system (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object proximate to the sensor electrodes alters the electric field associated with the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "trans capacitance") sensing methods based on changes in the capacitive coupling between sensor electrodes. In various embodiments, an input object proximate to the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. Further still, a processing system for an optical sensor (e.g., cameras) device may include circuitry configured to obtain and process images of the sensing region. In one more embodiments, a processing system for a combined capacitance sensor device and optical sensor device may include any combination of the above described circuitry. In some embodiments, the processing system (110) also includes electronically-readable instructions, such as firmware code, software code, and/or the like.

In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination circuitry (150) and a sensor circuitry (160). The determination circuitry (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor circuitry (160) may include functionality to drive the sensing elements to transmit transmitter signals and receive the resulting signals. For example, the sensor circuitry (160) may include sensory circuitry that is coupled to the sensing elements. The sensor circuitry (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals. The sensor circuitry (160) may include functionality to obtain images of the sensing region (120) from one or more cameras.

Although FIG. 1 shows a determination circuitry (150) and a sensor circuitry (160), alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes, cameras, and/or display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides positional information about the input (or lack of input) to some part of the electronic system (e.g., to a central processing system of the electronic system that is separate from the processing system (110), if such a separate central processing system exists). "Positional information" as used herein broadly encompasses absolute position, relative position, velocity, acceleration, and other types of spatial information.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen (155). For example, the input device (100) may include substantially transparent sensor electrodes overlaying the display screen (155) and provide a touch screen interface for the associated electronic system. The display screen (155) may be any type of dynamic display capable of displaying a visual interface to a user, and may include any type of light emitting diode (LED), organic LED (OLED), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110). In some embodiments, the display screen (155), integrated into an electronic device such as a smart phone, is an edge-to-edge display or infinity display, i.e., a display screen that is integrated into the electronic device without a surrounding bezel. Accordingly, it may be desirable to minimize the presence of visually disruptive elements such as conductive traces that may be difficult to hide due to the absence of the bezel.

It should be understood that while many embodiments are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
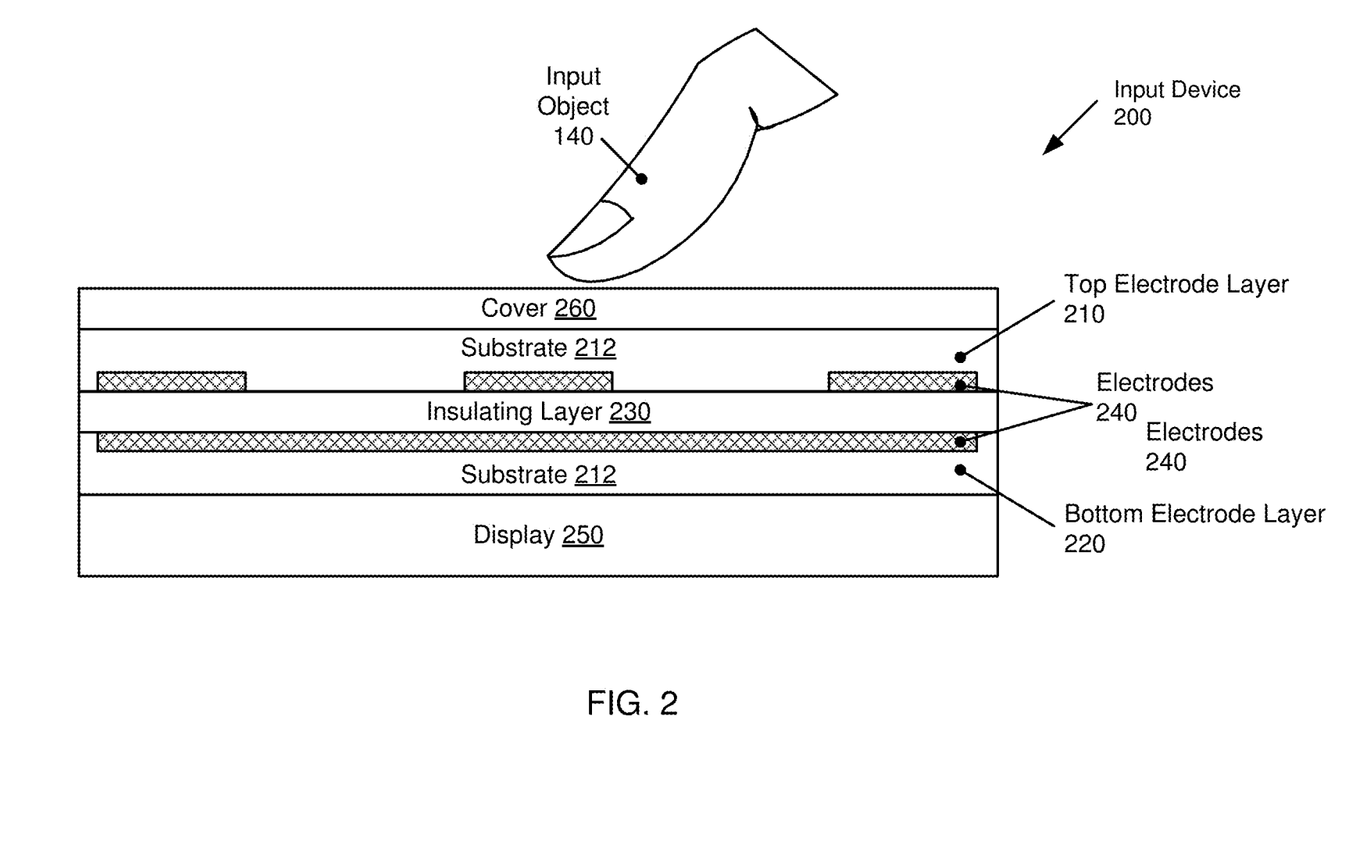
FIG. 2 shows a cross-section of an input device in accordance with one or more embodiments.

FIG. 2 shows an input device (200) in accordance with one or more embodiments. The input device (200) may correspond to input device (100), discussed above in reference to FIG. 1.

The input device (200) may include a top electrode layer (210), a bottom electrode layer (220), an insulating layer (230), a display (250), and a cover (260) that are stacked as subsequently described. The top electrode layer (210) may be disposed between the cover (260) that forms an input surface for sensing the presence of a finger or other input object, and the bottom electrode layer (220). Stated another way, the top electrode layer (210) is interposed between the cover (260) and/or display (250) and the bottom electrode layer (220).

The combination of the top electrode layer (210) and the bottom electrode layer (220), in one or more embodiments, is used for a capacitance-based sensing of input objects (140). More specifically, the top electrode layer (210) and the bottom electrode layer (220) are equipped with electrodes (240). The electrodes (240) may perform the capacitance sensing as previously described. In one or more embodiments, a transcapacitance sensing scheme is used to measure a change in the electric field between electrodes in the top and bottom electrode layers (210, 220), as a result of an input object (140) being present or absent. Capacitive sensing elements may be formed between top and bottom electrodes as further described with reference to FIGS. 3, 4, 5 and 6.

The top electrode layer (210) and/or the bottom electrode layer (220) may include a film (e.g. PET) or glass-based substrate (212) with a patterning disposed on the substrate (212) to form the electrodes (240). In some embodiments, the patternings are indium tin oxide (ITO) patternings. The patternings may be obtained using depositing or etching. A detailed description of the patternings is provided below with reference to FIGS. 4, 5 and 6.

The insulating layer (230), in one or more embodiments, electrically isolates the electrodes of the top electrode layer (210) from the electrodes of the bottom electrode layer (220). The insulation layer (230) may be a dedicated layer disposed between the top and bottom electrode layers (210, 220), or the insulation layer (230) may be provided by the top and/or bottom electrode layers, e.g., by disposing the electrodes (240) on the top surface of the top electrode layer (210) and/or by disposing the electrodes (240) on the bottom surface of the bottom electrode layer (220), with the substrate(s) (212) therefore forming the insulating layer (230).

The display (250), in one or more embodiments, provides a visual interface to a user. The display (250) may be any type of dynamic display capable of displaying visual content, and may include any type of light emitting diode (LED), organic LED (OLED), liquid crystal display (LCD), plasma, electroluminescence (EL), or other display technology. The display may be disposed at the bottom of the stack consisting of the display (250), the bottom electrode layer (220), the insulating layer (230), the top electrode layer (210) and the cover (260). Accordingly, the layers above the display (250) may be substantially transparent, either entirely or at least partially.

The cover (260), in one or more embodiments, may be a glass or polymer (e.g., PMMA) cover lens that may serve as an input surface enabling a user to interact with the input device (200) using the input object (140). The cover (260) may have anti-reflective, anti-scratch and/or anti-smudge characteristics.

The assembly of the input device (200) may be performed in various ways. For example, the electrodes (240) of the top electrode layer (210) may be disposed directly on the cover (260). The electrodes (240) of the bottom electrode layer (220) may be disposed directly on the display (250). Alternatively, dedicated substrates (212) may be used to support the electrodes (240). Adhesives may be used to permanently establish glass-film-film or other stack ups. Further, air gaps may or may not exist between the various layers.

Figure 3:
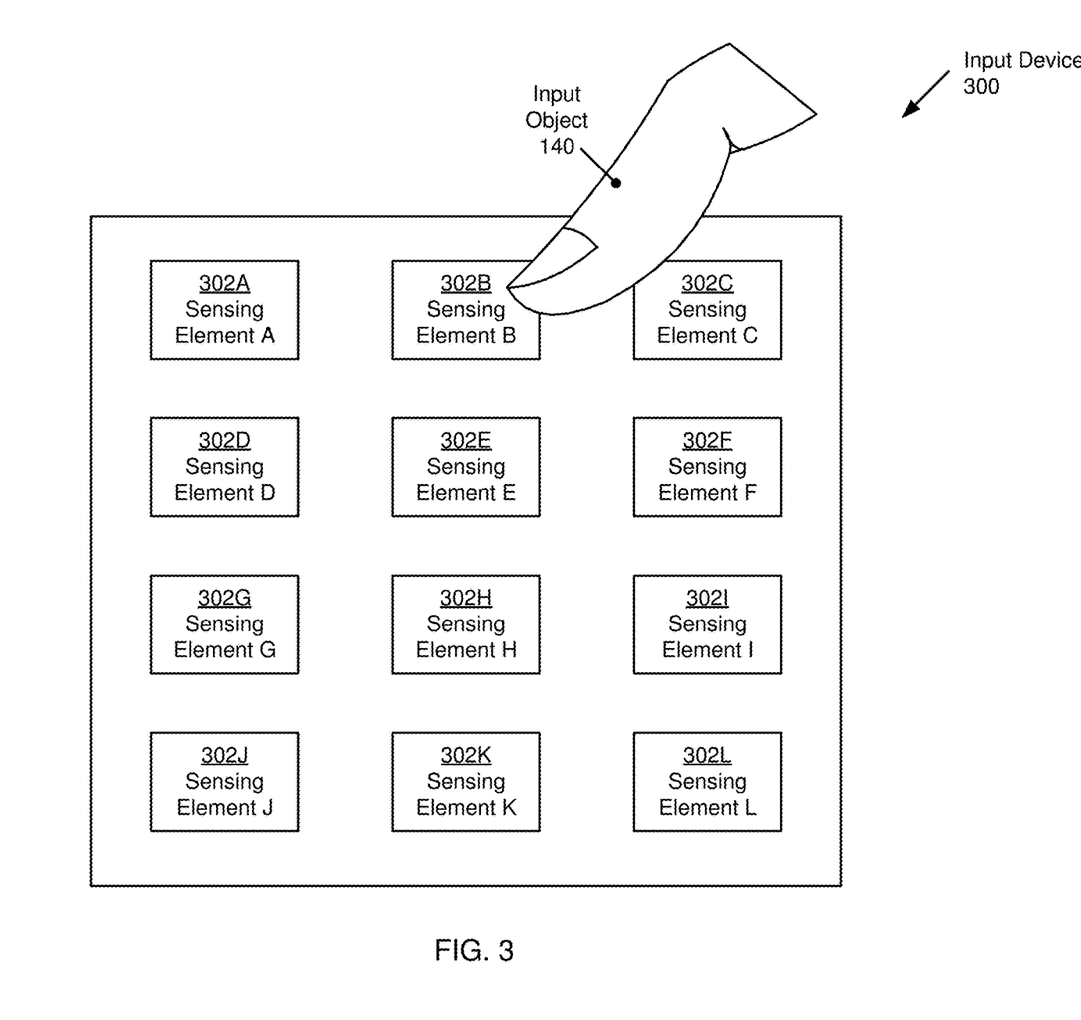
FIG. 3 shows a top view of an input device in accordance with one or more embodiments.

Turning to FIG. 3, a top view of an input device (300) in accordance with one or more embodiments, is shown. The input device (300) includes a set of sensing elements A-L (302A-302L). While a rectangular grid of sensing elements with twelve sensing elements is shown, the grid may have any geometry and may include any number of sensing elements. Many sensing elements may be used to obtain a desired spatial resolution of the sensing device. In one or more embodiments, the sensing elements form an input interface for a touch screen.

In one or more embodiments, each sensing element is a capacitive sensing element that includes an electrode in the top sensing layer (210) and an electrode in the bottom sensing layer (220), as illustrated in FIG. 2, and as further discussed below with reference to FIGS. 4, 5 and 6. Each of the sensing elements may, thus, capacitively determine the presence, location and/or motion of an input object (140).

Each of the sensing elements may be electrically interfaced, for example, with the sensor circuitry (160), shown in FIG. 1. To minimize the presence of visually disruptive elements such as conductive traces, but also to reduce cost and/or to increase reliability, it may be desirable to design the electrodes for the sensing elements in a manner to reduce the number of conductive traces that establish the electrical interface. In particular, it is desirable to reduce the number of conductive traces in areas where these traces may be undesirable, as further discussed below. The electrode design, based on using particular sensor patternings, is subsequently described with reference to FIGS. 4, 5 and 6.

Figure 4:
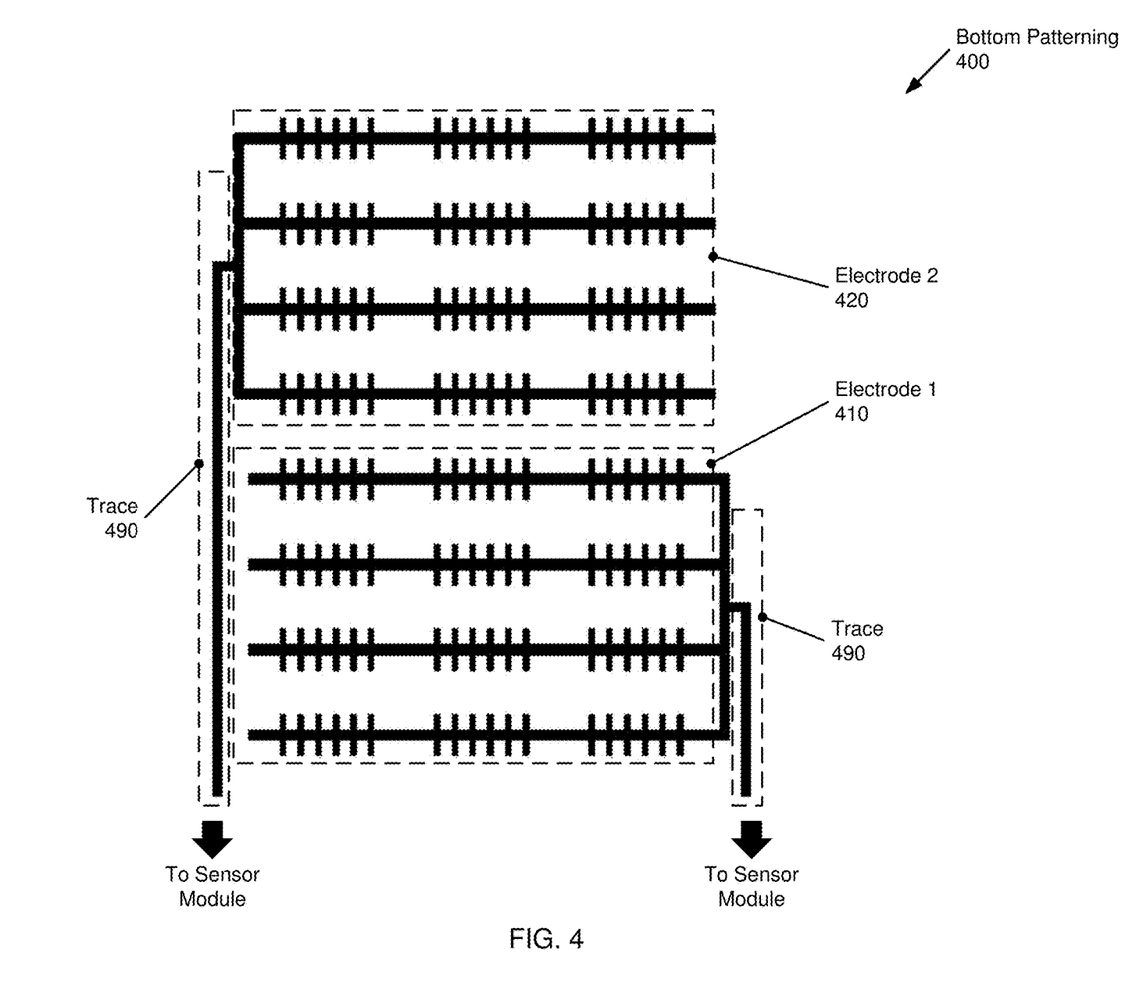
FIG. 4 shows a sensor patterning of an input device in accordance with one or more embodiments.
Figure 5:
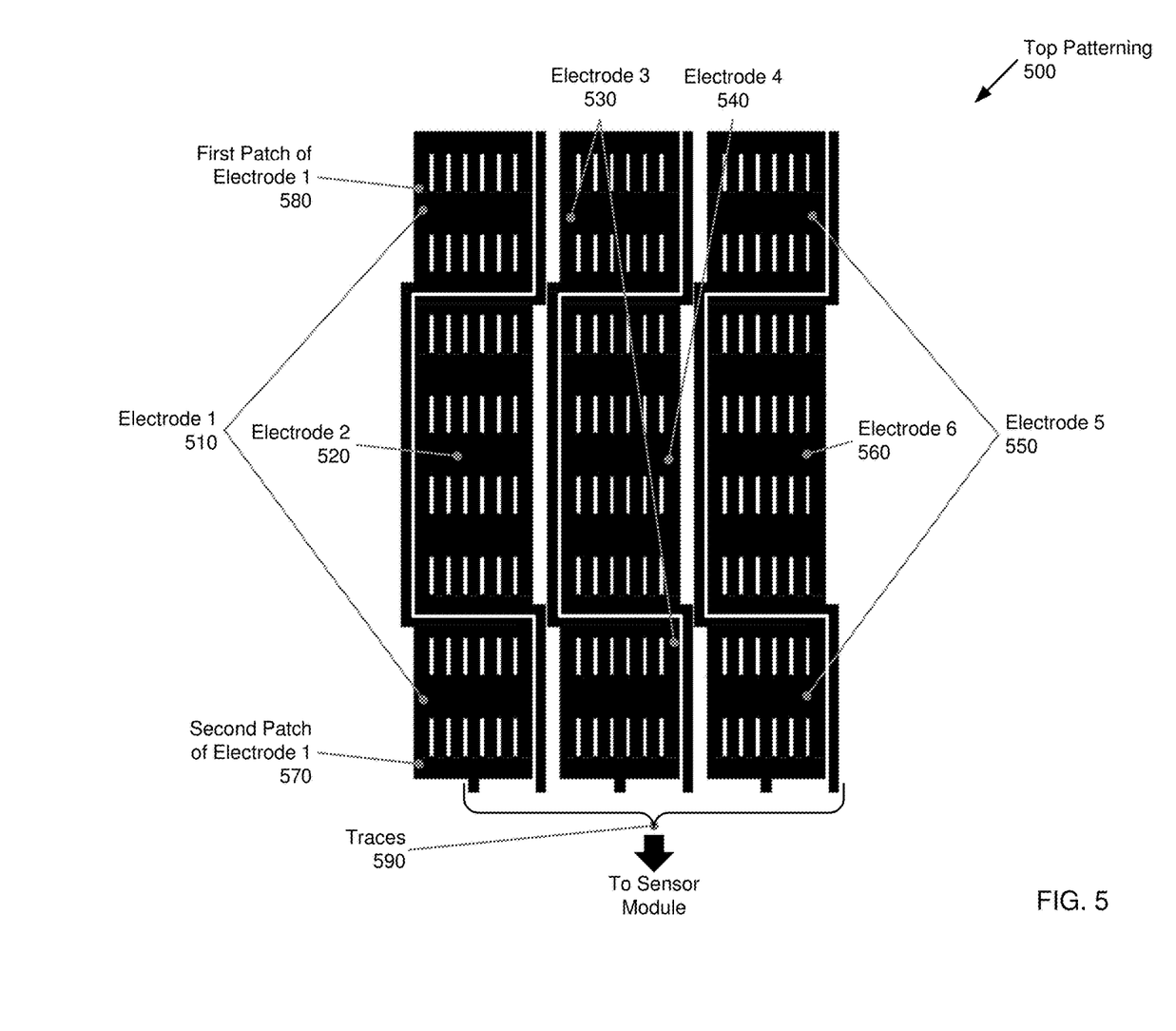
FIG. 5 shows a sensor patterning of an input device in accordance with one or more embodiments.
Figure 6:
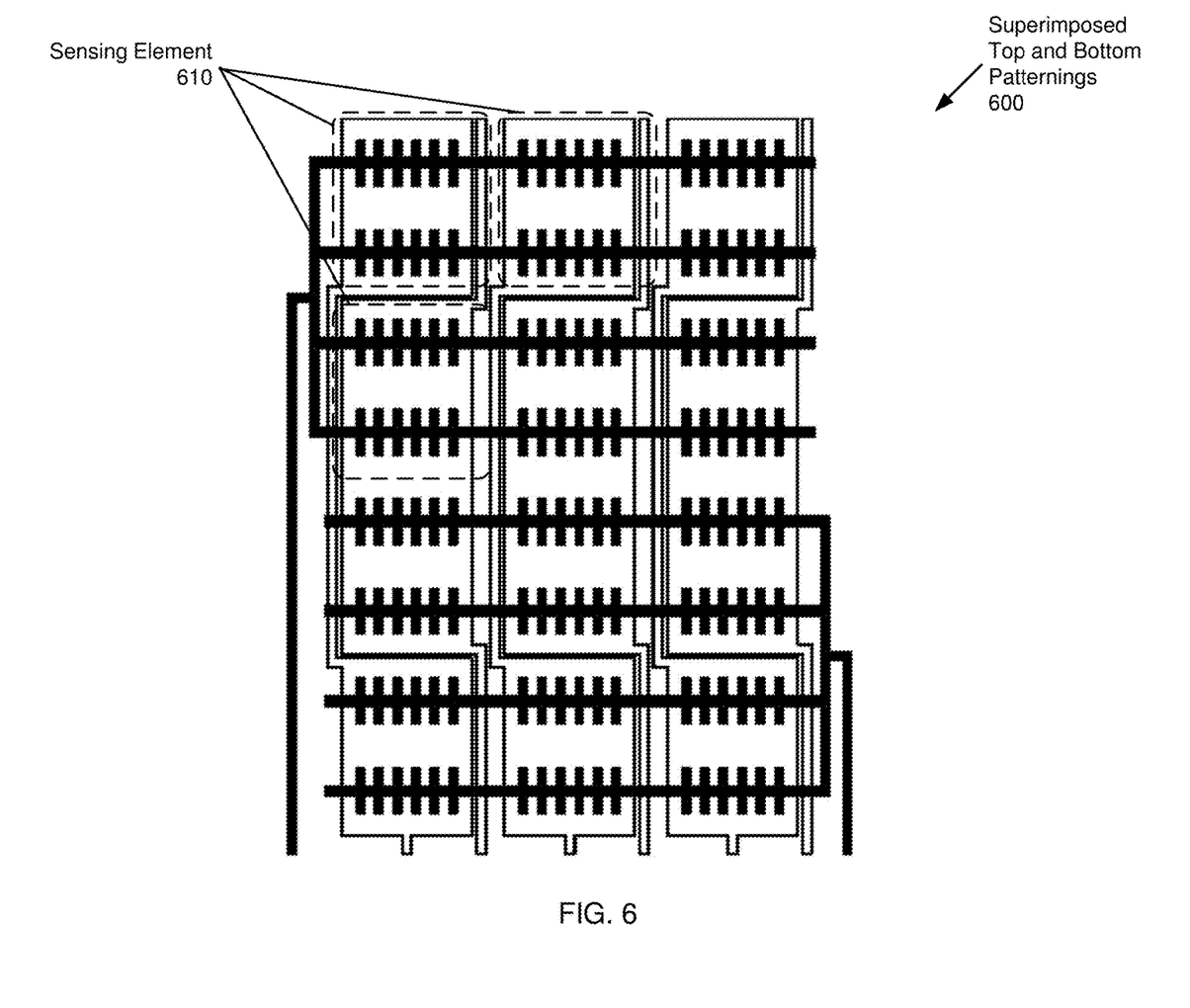
FIG. 6 shows a combination of superimposed sensor patternings of an input device in accordance with one or more embodiments.

FIGS. 4, 5 and 6 show sensor patternings of an input device in accordance with one or more embodiments. FIG. 4 shows a first sensor patterning, FIG. 5 shows a second sensor patterning, and FIG. 6 shows a combination of the superimposed first and second patternings.

In one or more embodiments, the patterning of FIG. 4 is a bottom patterning (400) that forms the electrodes (240) of the bottom electrode layer (220), and the patterning of FIG. 5 is a top patterning (500) that forms the electrodes (240) of the top electrode layer (210), as shown in FIG. 2.

The patternings (400, 500) may be generated on the surface of a substrate by first forming a blanket conductive layer on the surface of the substrate and by subsequently performing an etching and/or patterning process (e.g., lithography, wet etch, laser ablation, etc.). Alternatively, the patternings (400, 500) may be generated using deposition or screen printing methods. As illustrated in FIGS. 4 and 5, these patternings (400, 500) may form complex geometric structures that are subsequently discussed. In one example, the blanket conductive layer used to form the electrodes is a thin transparent conductive oxide layer (e.g., Antimony Doped Tin Oxide (ATO), Indium Tin Oxide (ITO), Zinc oxide) that is deposited using deposition techniques (e.g., Physical Vapor Deposition (PVD), Chemical Vapor Deposition (CVD)). In one or more embodiments, the electrodes are formed from a material that is substantially optically clear, and thus, in some configurations, can be disposed on top of a display (as shown in FIG. 2) without negatively affecting the visual appearance.

In FIG. 4, a bottom patterning (400) of the bottom electrode layer (220) is shown. The bottom patterning (400), in the example, includes two electrodes (410, 420). While two electrodes are shown, a bottom patterning (400) may include any number of electrodes, without departing from the disclosure. Specifically, the pattern shown in FIG. 4 may repeat to extend over a larger surface. For example, electrodes 3 and 4 may be added vertically adjacent to electrodes 1 or 2 in order to double the covered surface. In an input device, these electrodes may horizontally cross a display (250) while causing no or minimal visual interference due to the transparency of the patterning. The horizontal, elongated linear sections of the electrodes are equipped with multiple crossbars traversing the elongated linear sections, thereby forming fishbone-like structures. The number of crossbar structures may be dependent on the top patterning and the horizontal span of the display. The function of these elements is discussed below with reference to FIG. 6, where the bottom patterning (400) and the top patterning (500) are shown as superimposed, to discuss their interaction.

In one or more embodiments, the electrodes (410, 420) of the bottom patterning (400) operate as transmitting (TX) electrodes. Alternatively, the electrodes (410, 420) may operate as receiving (RX) electrodes. Further, the bottom patterning (400) may be arranged on top (thus becoming the top patterning) while the top patterning (500) may be arranged on the bottom (thus becoming the bottom patterning), without departing from the disclosure.

In one or more embodiments, each electrode (410, 420) interfaces with an electrically conductive trace (490). Each trace may be a thin metal layer (e.g., copper, aluminum, etc.). The traces may electrically interface the electrodes (410, 420) with, for example, the sensor circuitry (160), shown in FIG. 1. Unlike the substantially transparent electrodes (410, 420), the traces (490) may be visible. A trace (490) may have a width of, for example, a few μm up to 100 μm. While in some electronic devices in which a bezel frames the touch screen, the traces (490) may be hidden under the bezel, in other electronic devices that have an edge-to-edge touch screen (infinity display), the traces may be in a visible area of the touch screen.

In FIG. 5, a top patterning (500) of the top electrode layer (210) is shown. The top patterning (500), in the example, includes six electrodes (510, 520, 530, 540, 550, 560). While six electrodes are shown, a top patterning (500) may include any number of electrodes, without departing from the disclosure. In other words, the pattern may continue with additional electrodes in the horizontal and/or vertical direction. In an input device, these electrodes may be vertically organized in columns and may cause no or minimal visual interference due to the transparency of the patterning. In each column electrodes may alternate. For example, in the left column, electrodes 1 and 2 are alternatingly arranged, in the center column, electrodes 3 and 4 are alternatingly arranged, and in the right column, electrodes 5 and 6 are alternatingly arranged. More specifically, electrode 2 (520) is vertically enclosed by patches of electrode 1 (510), electrode 4 (540) is vertically enclosed by patches of electrode 3 (530), and electrode 6 (560) is vertically enclosed by patches of electrode 5 (550). Each of the electrodes includes a rectangular section(s) with cutouts. The rectangular section may be referred to as a patch of the electrodes (e.g., first patch of electrode 1 (580), second patch of electrode 1 (570)). Additional details regarding the arrangement of the electrodes (510, 520, 530, 540, 550, 560) and the function of these electrodes are provided below with reference to FIG. 6.

In one or more embodiments, the electrodes (510, 520, 530, 540, 550, 560) of the top patterning (500) operate as receiving (RX) electrodes. Alternatively, the electrodes (510, 520, 530, 540, 550, 560) may operate as transmitting (TX) electrodes.

In one or more embodiments, each electrode (510, 520, 530, 540, 550, 560) interfaces with an electrically conductive trace (590). Each trace may be a thin metal layer (e.g., copper, aluminum, etc.) configured to electrically interface the electrodes (510, 520, 530, 540, 550, 560) with, for example, the sensor circuitry (160), shown in FIG. 1. Unlike the substantially transparent electrodes (510, 520, 530, 540, 550, 560), the traces (590) may be visible.

In FIG. 6, the superimposed top and bottom patternings of FIGS. 4 and 5 are shown. Sensing elements (610) are formed by overlaid top and bottom electrodes of the top and bottom patternings. In the example of FIG. 6, a grid of 3×4 sensing elements (as initially introduced in FIG. 3) results from the superimposition of the top and bottom patternings. Each of the sensing elements is associated with a unique combination of top and bottom electrodes, in accordance with one or more embodiments. Specifically, for example, the top left sensing element is associated with electrode 2 (420) of the bottom patterning and electrode 1 of the top patterning. In contrast the top center sensing element, while also associated with electrode 2 (420) of the bottom patterning, is associated with electrode 3 (530) of the top patterning. Similarly, the middle left sensing electrode, while also associated with electrode 2 (420) of the bottom patterning, is associated with electrode 2 (520) of the top patterning.

Accordingly, each of the sensing elements is associated with a unique combination of a bottom electrode and a top electrode, i.e., a distinct pair of electrodes that is unique to the sensing element, while the number of electrodes in the bottom electrode layer is reduced by 50% (typically, one electrode is dedicated to one row of sensing elements, whereas in the discussed embodiments one electrode is associated with two rows of sensing elements), in accordance with one or more embodiments. The number of required traces in the bottom electrode layer are, thus, also reduced by 50%. As a result, the bottom electrode layer with a reduced number of traces may be particularly suitable in applications where such traces would be visually distracting.

An example for such an application is an infinity display of a smart phone with no bezel. The traces on the margin of the display may be visible, and accordingly any reduction in the number of traces may result in an improved visual appearance. Other benefits may include reduced complexity, simplified manufacturing and reduced cost.

Positional information for an input object may be unambiguously determined using the capacitance measurements obtained from the sensing elements, despite the reduced number of electrodes in the bottom electrode layer. A set of capacitance measurements obtained from multiple sensing elements may form a "capacitive image" (also "capacitive frame" or "sensing image").

In various embodiments the number of sensor electrodes may be adjusted to achieve a desired number of sensing elements (thereby affecting capacitive sensing resolution and/or size of the sensing region).

In one or more embodiments, the sensing elements (610) are configured to perform transcapacitive sensing. More specifically, the electrodes of the bottom patterning (400) may be configured to operate as transmitting (TX) electrodes. Electrodes 1 and 2 (410, 420) may transmit sequentially or simultaneously. To allow simultaneous transmitting, different transmitter signals according to one or more coding schemes may be used.

The receiving (RX) electrodes of the top patterning (500) may be configured to detect the transmitted signals. In one or more embodiments, the receiving electrodes are planar segments with cutouts. The cutouts may be arranged to match the geometry of the transmitting electrodes. In the examples shown in FIGS. 4, 5 and 6, the cutouts are slot-shaped, matching the geometry of the crossbars of the transmitting electrodes located below. The slots in the receiving electrodes cause the presence or absence of an input object to affect the capacitance measurement between a transmitting electrode and a receiving electrode by modulating the electric field between the transmitting and receiving electrodes. Those skilled in the art will appreciate that while a crossbar and slot design is shown, other geometric shapes may be used without departing from the disclosure. For example, the bottom patterning may include circular electrodes that are aligned with circular openings in the electrodes of the top patterning.

While a transcapacitive sensing arrangement with the bottom patterning including the transmitting electrodes and the top patterning including the receiving electrodes is described, those skilled in the art will appreciate that other sensing arrangements may be used without departing from the disclosure. For example, the bottom patterning may include receiving electrodes, whereas the top patterning may include transmitting electrodes. Similarly, both the electrodes of the top and bottom patternings may be driven, thereby acting as transmitting electrodes. Further, absolute capacitance sensing and/or combinations of transcapacitance and absolute capacitance sensing may be used without departing from the disclosure.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device, comprising:
a first electrode layer comprising a plurality of electrodes;
a second electrode layer comprising a plurality of electrodes;
an insulating layer disposed between the first electrode layer and the second electrode layer; and
a plurality of capacitive sensing elements organized in rows and columns,
wherein each of the plurality of capacitive sensing elements is formed by one of the plurality of electrodes in the first electrode layer and one of the plurality of electrodes in the second electrode layer,
wherein a first subset of the plurality of capacitive sensing elements organized in adjacent rows share a common first electrode in the first electrode layer,
wherein each of the first subset of the plurality of capacitive sensing elements is associated with a distinct electrode of the plurality of electrodes in the second electrode layer,
wherein the plurality of electrodes in the second electrode layer comprises a first electrode and a second electrode, wherein the first electrode is within one of the columns and comprises a pair of rectangular patches that encloses the second electrode of the second electrode layer,
wherein the second electrode of the second electrode layer is associated with two of the plurality of capacitive sensing elements, and
wherein at least a subset of the rectangular patches each span two of the plurality of capacitive sensing elements in a corresponding column.

2. The input device of claim 1, further comprising a second subset of the plurality of capacitive sensing elements organized in adjacent rows sharing a common second electrode in the first electrode layer.

3. The input device of claim 2, further comprising:
a first trace electrically connecting the common first electrode for the first subset of the plurality of capacitive sensing elements with a sensor circuitry; and
a second trace electrically connecting the common second electrode for the second subset of the plurality of capacitive sensing elements with the sensor circuitry.

4. The input device of claim 1,
wherein the plurality of electrodes in the first electrode layer form alternating rows extending across the columns of the capacitive sensing elements.

5. The input device of claim 4, wherein the alternating rows are formed by the common first electrode being part of two adjacent rows of capacitive sensing elements and a common second electrode being part of two adjacent rows of capacitive sensing elements.

6. The input device of claim 1,
wherein the plurality of electrodes in the second electrode layer are organized in columns of alternating electrodes,
wherein each of the plurality of electrodes in the second electrode layer is specific to a column, and
wherein the columns of alternating electrodes correspond to the columns of capacitive sensing elements.

7. The input device of claim 1, wherein each of the plurality of capacitive sensing elements of the input device is formed by a unique combination of one electrode in the first electrode layer and one electrode in the second electrode layer.

8. The input device of claim 1 further comprising:
a display configured to provide visual output;
and an input surface configured to receive an input by an input object;
wherein the first electrode layer, the second electrode layer, and the insulating layer are disposed between the display and the input surface.

9. The input device of claim 1,
wherein the first electrode layer comprises transmitting electrodes,
wherein the second electrode layer comprises receiving electrodes, and
wherein the plurality of capacitive sensing elements operate in a transcapacitance sensing mode, using the transmitting electrodes of the first electrode layer and the receiving electrodes of the second electrode layer.

10. The input device of claim 9,
wherein the transmitting electrodes comprise elongated linear sections and crossbars traversing the elongated linear sections, and
wherein the receiving electrodes comprise planar segments with cutouts arranged to match the crossbars.

11. An electronic device comprising:
a display configured to provide visual output;
an input surface configured to receive an input by an input object; and
an input device disposed between the display and the input surface and configured to process the received input by the input object, the input device comprising:
a first electrode layer comprising a plurality of electrodes;
a second electrode layer comprising a plurality of electrodes;
an insulating layer disposed between the first and the second electrode layers; and
a plurality of capacitive sensing elements organized in rows and columns,
wherein each of the capacitive sensing elements is formed by one of the plurality of electrodes in the first electrode layer and one of the plurality of electrodes in the second electrode layer,
wherein a first subset of the plurality of capacitive sensing elements organized in adjacent rows share a common first electrode in the first electrode layer, and
wherein each of the first subset of the plurality of capacitive sensing elements is associated with a distinct electrode of the plurality of electrodes in the second electrode layer,
wherein the plurality of electrodes in the second electrode layer comprises a first electrode and a second electrode, wherein the first electrode is within one of the columns and comprises a pair of rectangular patches that encloses the second electrode of the second electrode layer,
wherein the second electrode of the second electrode layer is associated with two of the plurality of capacitive sensing elements, and
wherein at least a subset of the rectangular patches each span two of the plurality of capacitive sensing elements in a corresponding column.

12. The electronic device of claim 11, wherein the input device further comprises a second subset of the plurality of capacitive sensing elements organized in adjacent rows sharing a common second electrode in the first electrode layer.

13. The electronic device of claim 12, wherein the input service further comprises:
a first trace electrically connecting the common first electrode for the first subset of the plurality of capacitive sensing elements with a sensor circuitry; and
a second trace electrically connecting the common second electrode for the second subset of the plurality of capacitive sensing elements with the sensor circuitry.

14. The electronic device of claim 13, wherein the first trace is disposed at a vertical edge of the display.

15. The electronic device of claim 14, wherein the display is an edge-to-edge display.

16. The electronic device of claim 11,
wherein the plurality of electrodes in the first electrode layer form alternating rows extending across the columns of the capacitive sensing elements.

17. The electronic device of claim 16, wherein the alternating rows are formed by the common first electrode being part of two adjacent rows of capacitive sensing elements and a common second electrode being part of two adjacent rows of capacitive sensing elements.

18. The electronic device of claim 11,
wherein the plurality of electrodes in the second electrode layer are organized in columns of alternating electrodes,
wherein each of the plurality of electrodes in the second electrode layer is specific to a column, and
wherein the columns of alternating electrodes correspond to the columns of capacitive sensing elements.

19. The electronic device of claim 11, wherein each of the plurality of capacitive sensing elements of the input device is formed by a unique combination of one electrode in the first electrode layer and one electrode in the second electrode layer.

20. The electronic device of claim 11,
wherein the first electrode layer comprises transmitting electrodes,
wherein the second electrode layer comprises receiving electrodes, and
wherein the plurality of capacitive sensing elements operate in a transcapacitance sensing mode, using the transmitting electrodes of the first electrode layer and the receiving electrodes of the second electrode layer.

* * * * *